US011163275B2

(12) United States Patent
Della Corte et al.

(10) Patent No.: US 11,163,275 B2
(45) Date of Patent: *Nov. 2, 2021

(54) COLLABORATIVE ADJUSTMENT OF RESOURCES WITHIN A MANAGED ENVIRONMENT

(71) Applicant: International Business Machines Corporation, Armonk, NY (US)

(72) Inventors: Gianluca Della Corte, Rome (IT); Alessandro Donatelli, Rome (IT); Antonio M. Sgro, Fiumicino (IT)

(73) Assignee: International Business Machines Corporation, Armonk, NY (US)

( * ) Notice: Subject to any disclaimer, the term of this patent is extended or adjusted under 35 U.S.C. 154(b) by 204 days.

This patent is subject to a terminal disclaimer.

(21) Appl. No.: 16/451,500

(22) Filed: Jun. 25, 2019

(65) Prior Publication Data

US 2019/0310594 A1    Oct. 10, 2019

Related U.S. Application Data

(63) Continuation of application No. 14/751,327, filed on Jun. 26, 2015, now Pat. No. 10,394,199.

(51) Int. Cl.
*G05B 15/02* (2006.01)
*F24F 13/00* (2006.01)
(Continued)

(52) U.S. Cl.
CPC .............. *G05B 15/02* (2013.01); *F24F 13/00* (2013.01); *G06Q 10/103* (2013.01); *G06Q 50/06* (2013.01);
(Continued)

(58) Field of Classification Search
None
See application file for complete search history.

(56) References Cited

U.S. PATENT DOCUMENTS

| 4,926,839 A | 5/1990 | Sugawara |
| 5,078,316 A | 1/1992 | Hara |

(Continued)

FOREIGN PATENT DOCUMENTS

JP    03068849 A    3/1991

OTHER PUBLICATIONS

List of IBM Patents or Patent Applications Treated as Related (Appendix P), filed herewith.
U.S. Appl. No. 14/751,327, filed Jun. 26, 2015.

*Primary Examiner* — Jason Lin
(74) *Attorney, Agent, or Firm* — Edward J. Wixted, III (57) ABSTRACT

A method for adjusting a resource within an area utilizing voting by users. The method includes a computer processor receiving a request from one or more of the users to adjust a resource. The method further includes generating a voting poll for the resource. The method further includes communicating the generated voting poll to a plurality of users, wherein the plurality of users includes the one or more users. The method further includes identifying valid responses to the communicated voting poll based on a first policy related to the resource. The method further includes determining a response to the voting poll, wherein the response is based, at least in part, on the first policy related to the resource and aggregated valid responses of the voting poll. The method further includes applying the determined response to the resource.

20 Claims, 4 Drawing Sheets

(51) Int. Cl.
  *G06Q 10/10* (2012.01)
  *G06Q 50/06* (2012.01)
  *G07C 13/00* (2006.01)

(52) U.S. Cl.
  CPC ...... *G07C 13/00* (2013.01); *G05B 2219/2614* (2013.01); *G05B 2219/2642* (2013.01)

(56) References Cited

U.S. PATENT DOCUMENTS

| | | |
|---|---|---|
| 5,086,385 A | 2/1992 | Launey |
| 5,170,935 A | 12/1992 | Federspiel |
| 5,762,265 A | 6/1998 | Kitamura |
| 5,934,084 A | 8/1999 | Lee |
| 6,145,751 A | 11/2000 | Ahmed |
| 6,216,956 B1 | 4/2001 | Ehlers |
| 6,220,039 B1 | 4/2001 | Kensok |
| 7,017,120 B2 * | 3/2006 | Shnier ............... H04N 21/25891 715/783 |
| 7,089,087 B2 | 8/2006 | Dudley |
| 7,302,313 B2 | 11/2007 | Sharp |
| 7,886,984 B2 | 2/2011 | Tsai |
| 8,600,556 B2 | 12/2013 | Nesler |
| 8,615,327 B2 | 12/2013 | Takagi |
| 2003/0217143 A1 | 11/2003 | Dudley |
| 2003/0227478 A1 | 12/2003 | Chatfield |
| 2004/0118136 A1 | 6/2004 | Patel |
| 2004/0243355 A1 | 12/2004 | Kobayashi |
| 2005/0061027 A1 | 3/2005 | Hirakuni |
| 2006/0004492 A1 | 1/2006 | Terlson |
| 2006/0100744 A1 | 5/2006 | Sharma |
| 2007/0138307 A1 | 6/2007 | Khoo |
| 2009/0204262 A1 | 8/2009 | Nishimura |
| 2010/0262298 A1 | 10/2010 | Johnson |
| 2011/0088455 A1 | 4/2011 | Takagi |
| 2012/0259469 A1 | 10/2012 | Ward |
| 2014/0077946 A1 | 3/2014 | Tran |
| 2014/0214489 A1 | 7/2014 | Bedi |
| 2014/0277765 A1 | 9/2014 | Karimi |
| 2015/0330645 A1 | 11/2015 | Speranzon |
| 2015/0338117 A1 * | 11/2015 | Henneberger ......... G05B 15/02 700/276 |

* cited by examiner

COLLABORATIVE ADJUSTMENT OF RESOURCES WITHIN A MANAGED ENVIRONMENT

BACKGROUND OF THE INVENTION

The present invention relates generally to the field of resource management within a building, and more particularly to utilizing occupant feedback to affect resource management within a building.

Modern buildings are often comprised of various zones (e.g., areas of control). The area of a heating, ventilation, and air conditioning (HVAC) control zone can be different from the area of a lighting control zone. A building controlled by a building automation system (BAS) is often referred to as an "intelligent" building or a "smart" building. In a smart building, sensors often replace individual control units, such as pneumatic thermostats or other sensing/control units distributed within a zone. Sensors can be networked to a central BAS providing for real-time monitoring and control of a plurality of control units as opposed to pneumatic sensors or other local sensing/control units. A non-BAS HVAC system may have sensors within the ductwork and utilize dampers controlled by wall-mounted thermostats, which may be located in a main isle or an unoccupied office.

Energy related control policies for buildings, such as HVAC policies, lighting schedules, and set points are typically defined and imposed by facility managers based on their own experience or an industry standard, such as comfort models described in an AHRAE (American Society of Heating, Refrigerating, and Air Conditioning Engineers) handbook. For example, environmental controls for a HVAC system primarily focus on temperature, relative humidity, and airflow. Additional environmental considerations within a HVAC system may include: filtration, odor regulation, ionization, disinfection, and energy recovery. The environmental concerns of the occupants of one zone within a building or facility can differ from other occupants in another zone. For example, the primary facility concerns for a data center area may be cooling and humidity control (e.g., static electricity mitigation); the primary facility controls for a lab may include filtration, ionization, and disinfection for the HVAC. Areas that have transitory occupants, for example, a lobby or cafeteria may tolerate larger environmental variations.

SUMMARY

According to aspects of the present invention, there is a method, computer program product, and/or system for adjusting a resource within an area utilizing voting by users. The method includes one or more computer processors receiving a request from one or more of the users to adjust a resource. The method further includes one or more computer processors generating a voting poll for the resource. The method further includes one or more computer processors communicating the generated voting poll to a plurality of users, wherein the plurality of users includes the one or more users. The method further includes one or more computer processors identifying valid responses to the communicated voting poll based on a first policy related to the resource. The method further includes one or more computer processors determining a response to the voting poll, wherein the response is based at least in part on the first policy related to the resource and aggregated valid responses of the voting poll. The method further includes one or more computer processors applying the determined response to the resource.

DETAILED DESCRIPTION

Embodiments of the present invention recognize that occupants, who are the end users of a building, typically have no opportunity to contribute to the definition of control policies or have limited means to communicate with facility managers or other occupants for their specific needs or preferences. Some facility managers may operate the building based on an aggressive energy conservation/cost control policy, which may have an adverse effect on the comfort of the occupants of the building. Other facility managers may operate based on the comfort of the occupants, which may reduce the opportunities for energy savings. In some circumstances, a facilities manager may respond to occupant comfort complaints from a vocal minority and over-react, adjusting a resource (e.g., HVAC, lighting, etc.) utilized by a plurality of occupants to a condition that may negatively affect a majority of the occupants.

Embodiments of the present invention provide occupants (e.g., users of a shared/utilized resource) a collaborative method to adjust the condition of a shared/utilized resource. Embodiments of the present invention generate polls that users (e.g., occupants) utilize to vote for changes to one or more utilized resources. In some embodiments, a poll for a utilized resource is initiated by a system. In other embodiments, users may request that a poll be initiated. Once a minimum number of users (e.g., a number of users that qualify as a quorum of users) request that a poll be initiated, embodiments of the present invention generate one or more polls for the utilized resources based on the requests of the users.

Embodiments of the present invention also recognize that the amount of an adjustment that is applied to a utilized resource should be restricted. Embodiments of the present invention utilize resource policies to constrain the amount of adjustment that is automatically applied to a utilized resource. Resource policies may be derived from historical data, user feedback (e.g., polls), cost/energy/comfort considerations, and business needs. Embodiments of the present invention also permit a resource control administrator (e.g., facilities manager) to utilize the results of the utilized resource polls to determine whether to override the adjustment setting of a resource policy for a utilized resource. Further embodiments of the present invention can interface with a smart building control system to obtain automated responses (e.g., overrides) as opposed to manual intervention from a resource control administrator.

Embodiments of the present invention incorporate the validation of the responses (e.g., votes) of users to one or more generated utilized resource polls. The validation criteria may be included in: a resource policy, a policy of the facility (e.g., building), a policy of a business, and a voting duration associated with a poll. Some embodiments of the present invention also recognize that users (e.g., occupants) may be mobile and may utilize various computing devices (e.g., a desktop computer, a tablet computer, a smartphone, etc.) during a day and/or a job. For example, a user may: utilize a table computer while at home to check the schedule for the day, respond to an information request via a smartphone while in transit to a workplace, utilize a desktop computer during the day, and present a report in a conference room utilizing a shared device. Embodiments of the present invention may utilize various technologies to locate a user. Some embodiments locate a user by the device that communicated the responses of the user to a poll. Other embodiments seek to track the location of a user in real time. The location of a user may determine whether one or more responses (e.g., votes) from a user are valid or invalid. In an embodiment, the votes of a user may transfer between the zones visited by the user. In another embodiment, a user is sent a new poll that is associated with the zone that the user enters.

Additional embodiments of the present invention generate reports for one or more utilized resources. In some embodiments, the utilized resource reports may be depicted graphically, depicted within a spreadsheet, and/or included in a visual representation of the affected zones/area (e.g., overlaid on a floor plan). In an embodiment of the present invention, reports are accessible via a web server (e.g., intranet, Internet). In another embodiment, utilized resource reports are customized for the affected users and communicated to the affected users.

The descriptions of the various scenarios, instances, and examples related to the present invention have been presented for purposes of illustration but are not intended to be exhaustive or limited to the embodiments disclosed.

Figure 1:
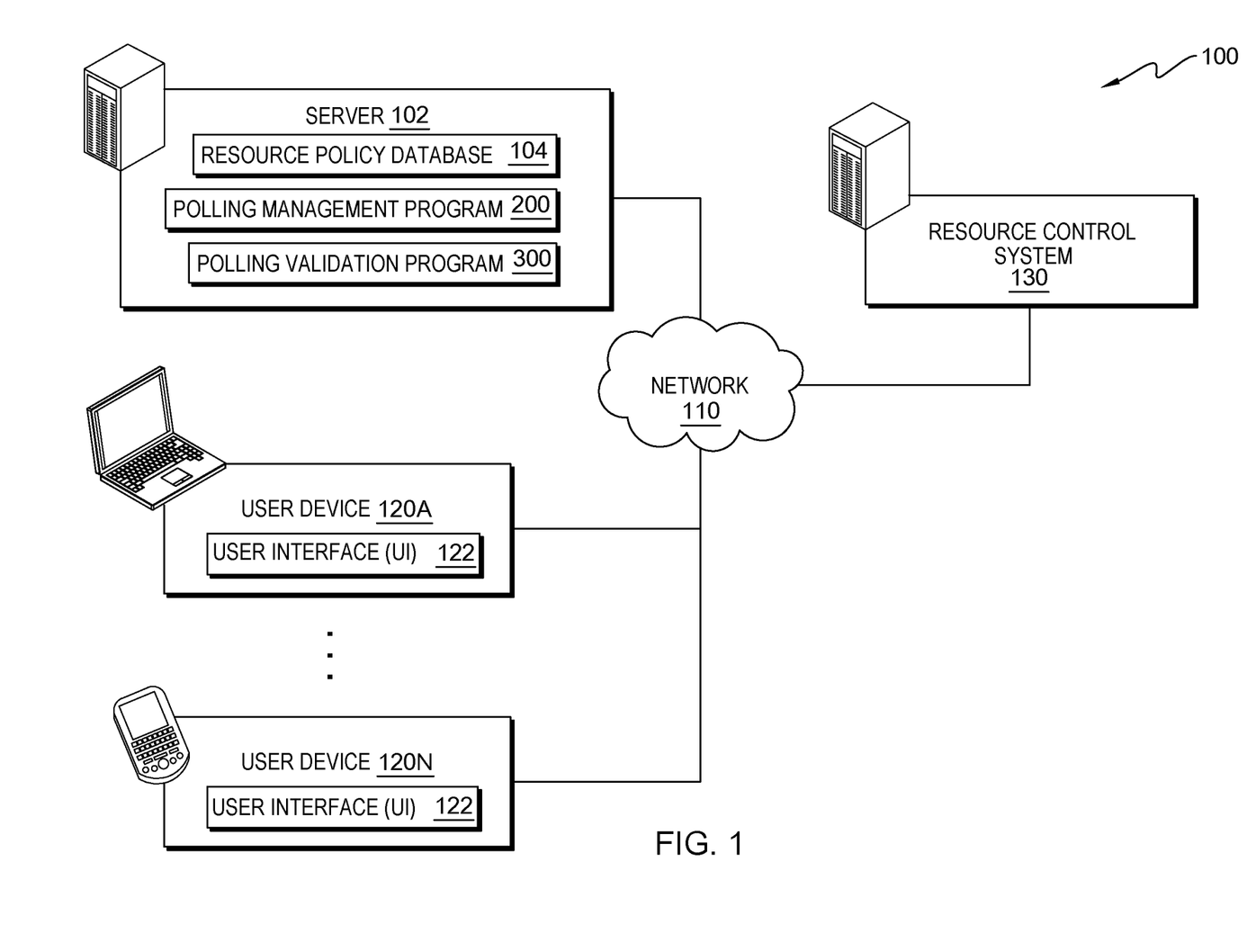
FIG. 1 illustrates a distributed computing environment, in accordance with an embodiment of the present invention.

The present invention will now be described in detail with reference to the Figures. FIG. 1 is a functional block diagram illustrating distributed computing environment 100 in an embodiment, in accordance with the present invention. An embodiment of distributed computing environment 100 includes server 102, user devices 120A-N, and resource control system 130, all interconnected over network 110. Many modifications to the depicted environment may be made by those skilled in the art without departing from the scope of the invention as recited by the claims.

Server 102, user devices 120A-N, and resource control system 130 may be laptop computers, tablet computers, netbook computers, personal computers (PC), desktop computers, personal digital assistants (PDA), smart phones, wearable devices (e.g., digital eyeglasses, smart glasses, a smart watch), or any programmable computer systems known in the art. In certain embodiments, server 102, user devices 120A-N, and resource control system 130 represent computer systems utilizing clustered computers and components (e.g., database server computers, application server computers, etc.) that act as a single pool of seamless resources when accessed through network 110, as is common in data centers and with cloud-computing applications. In general, server 102, user devices 120A-N, and resource control system 130 are representative of any programmable electronic device or combination of programmable electronic devices capable of executing machine readable program instructions and communicating with user computers, such as user devices 120A-N, via network 110. Server 102, user devices 120A-N, and resource control system 130 may include components, as depicted and described in further detail with respect to FIG. 4, in accordance with embodiments of the present invention.

Server 102 includes resource policy database 104, polling management program 200, polling validation program 300, and various programs and databases (e.g., a website interface, geo-locating software, LAN monitoring utilities, an employee database, a historic facility information database, a wireless hotspot database, etc.) (not shown). In some embodiments, server 102 may be part of an integrated facility management system (e.g., security, environmental, safety, etc.) for an area, one or more buildings, or a complex that includes resource control system 130.

In one embodiment, resource policy database 104 contains databases and log files that store policies, derived over time and/or set by one or more resource control managers, for managing resources within an area, one or more buildings, or a complex of buildings. In one embodiment, resource policy database 104 may include resource policies that are hierarchically applied. For example, if a user is located beyond an area defined within a resource policy, any responses by the user to the utilize resource poll can be treated as invalid. In another example, the amount of adjustment applied to a utilized resource may be constrained by occurring on a non-workday as opposed to a workday. In another embodiment, a resource policy may be tiered. In an example, if greater than 75% of users vote for a temperature increase, the maximum temperature increase is three degrees Fahrenheit (F). If 60% to 75% of users vote for a temperature increase, the maximum temperature increase is two degrees Fahrenheit. However, if less than 60% of users vote for a temperature increase, no adjustment is made to the temperature.

In some embodiments, resource policies may be dynamically adjusted by: a cost of a utility; weather conditions outside of the area, the building, or the complex of buildings; an occupancy rate; and the condition of a utility (e.g., a brown-out, water conservation condition, etc.). In other embodiments, resource policy database 104 may include resource policies that trigger warnings or alternate responses. In one example, if 50% of users vote for a small adjustment to a utilized resource, and 10% of users vote for the maximum adjustment for a utilized resource, a resource policy permits the small adjustment. In another example, if 90% of the users vote is for the maximum adjustment of a resource policy, then the resource control administrator for the utilized resource may be notified (e.g., warned). Subsequently, the resource control administrator may permit the adjustment based on polling results, initiate another poll with a wider range for the resource adjustment, and/or investigate the reason for the results of the poll.

In one embodiment, server 102, user devices 120A-N, and resource control system 130 communicate through network 110. Network 110 can be, for example, a local area network (LAN), a telecommunications network, a wireless local area network (WLAN), such as an intranet, a wide area network (WAN), such as the Internet, or any combination of the previous and can include wired, wireless, or fiber optic connections. In general, network 110 can be any combination of connections and protocols that will support communications between server 102, user devices 120A-N, and resource control system 130, in accordance with embodiments of the present invention. In another embodiment, network 110 operates locally via wired, wireless, or optical connections and can be any combination of connections and protocols (e.g., near field communication (NFC), laser, infrared, etc.).

In some embodiments, polling validation program 300 utilizes network 110 to determine the location of instances of user devices 120A-N utilizing LAN port addresses and/or a wireless-based positioning system (WPS). The localization technique used for determining the position with wireless access points is based on measuring the intensity of the received signal (received signal strength or RSS) and the method of "fingerprinting." Typical parameters useful to geo-locate the wireless "hotspot" or wireless access point include the service set identifier (SSID) and the media access control (MAC) address of the access point. The accuracy depends on the number of positions that have been entered into the location database (e.g., a facility database). The wireless hotspot database is filled by correlating mobile device GPS location data with wireless hotspot MAC addresses. Other systems that may be utilized to determine the locations for user devices 120A-N are indoor positioning systems (not shown). An indoor positioning system (IPS) is a solution to locate objects or people inside a building using radio waves, magnetic fields, acoustic signals, or other sensory information collected by mobile devices.

User devices 120A-N include user interface (UI) 122 and various programs (not shown). Examples of programs that user devices 120A-N include are: a web browser, an e-mail client, a word processor, security software (e.g., a firewall program, an anti-virus program, an encryption program, etc.), an instant messaging (IM) application (app), and a communication (e.g., phone) application. The users of user devices 120A-N can interact with the respective UI 122 for user devices 120A-N via a singular device, such as a touch screen (e.g., display) that performs both input to a graphical user interface (GUI) and as an output device (e.g., a display) presenting a plurality of icons associated with software applications or images depicting the executing software application. Optionally, a software application (e.g., a web browser) can generate UI 122 operating within the GUIs of user devices 120A-N.

UI 122 accepts input from a plurality of input/output (I/O) devices including, but not limited to, a tactile sensor interface (e.g., a touch screen, a touchpad) or a natural user interface (e.g., voice control unit, motion capture device, etc.). An I/O device interfacing with a UI 122 may be connected to a user device 120 which may operate utilizing wired (e.g., USB port) or wireless network communications (e.g., infrared, NFC, etc.). For example, an I/O device may be a peripheral, such as a keyboard, a mouse, a trackball, and a click wheel that provides input from a user. A user may utilize UI 122 to view the results of resource polls generated by polling management program 200. A user may also utilize UI 122 to communicate resource polls and responses with polling validation program 300.

In another embodiment, UI 122 provides a resource control administrator access to server 102 and resource control system 130 via a computing device (not shown) connected to network 110. A resource control administrator may utilize UI 122 to initiate a utilized resource poll by polling management program 200. A resource control administrator may also utilize UI 122 to override one or more resource policies utilized by polling management program 200. In one scenario, a resource control administrator utilizes UI 122 to access server 102 and/or resource control system 130 locally. In another scenario, a resource control administrator utilizes UI 122 to access server 102 and/or resource control system 130 remotely.

Polling management program 200 generates polls for one or more utilized resources within an area, one or more buildings, or a complex of buildings. Polling management program 200 utilizes polling validation program 300 to communicate the one or more polls to the user within the area, the building, or the complex of buildings so that the users may vote on modifications to the one or more utilized resources that are included in a poll. Polling management program 200 utilizes the responses received from polling validation program 300 to determine whether sufficient valid user input (e.g., votes, responses) is received to initiate a change to a utilized resource based on one or more policies for the utilized resource.

In some embodiments, polling management program 200 may generate responses based on different utilized resource policies. In one example, polling management program 200 selects the utilized resource policy based on a period of time (e.g., summer, winter, over a holiday, among shifts, etc.). In another example, polling management program 200 selects the utilized resource policy based on a number of users in an area. In other embodiments, polling management program 200 may receive a utilized resource policy override from a resource control administrator. In addition, polling management program 200 generates one or more reports for the utilized resource polls. In one embodiment, the one or more reports (e.g., documents, graphs, spreadsheets, etc.) may be accessible to the users for user devices 120A-N via UI 122 (e.g., via a linked network drive). In another embodiment, the one or more reports may be accessible to the users for user devices 120A-N via a website link (e.g., intranet, Internet).

Polling validation program 300 communicates one or more utilized resource polls generated by polling management program 200 to a plurality of users. In an embodiment, polling validation program 300 communicates (e.g., via an e-mail, an office productivity function, etc.) the one or more utilized resource polls to users of a utilized resource. In another embodiment, polling validation program 300 communicates a uniform resource locator (URL) or a web-link to the users of a utilized resource. In one example, polling validation program 300 utilizes an instant messaging (IM) application to communicate a URL associated with a poll to user devices 120F-M, which are identified as smartphones.

Polling validation program 300 also receives the responses of the utilized resource polls and validates the responses of users. In some embodiments, polling validation program 300 utilizes the determined location of a user to validate the response of the user to a utilized resource poll. In one scenario, polling validation program 300 determines that a utilized resource policy dictates that a user be on premises to generate a valid response to a utilized resource poll. In another scenario, polling validation program 300 determines that a utilized resource policy dictates that a vote (i.e., a response) by a user is restricted to the area where the poll was submitted. A vote for a subsequent poll may be valid for an area where the user responds to the subsequent poll. In other embodiments, polling validation program 300 utilizes time to validate a response of a user. In an example, polling validation program 300 provides a countdown timer with a utilized resource poll. Polling validation program 300 validates responses received prior to the countdown timer displaying zero remaining time. In addition, polling validation program 300 communicates the validated results to polling management program 200.

Resource control system 130 utilizes information included in resource policy database 104 to control one or more resources and/or functions within an area, one or more buildings, or a complex of buildings. In some embodiments, resource control system 130 is an integrated facility management system (e.g., smart building system) for one or more buildings, or a complex of buildings that monitors and manages multiple functions. For example, resource control system 130 may manage: security (e.g., access control, cyber-security, visual/camera monitoring, etc.), environmental (e.g., temperature, relative humidity (RH), airflow, water temperature, etc.), safety (e.g., fire detection, hazardous material release detection, etc.), etc.

In other embodiments, multiple instances of resource control system 130 may exist, e.g., a different resource control system 130 for each building function. In an example, an instance of resource control system 130 for a building may be the HVAC system. Another instance of resource control system 130 for the building may be a lighting/window control system. In some scenarios, resource control system 130 is an automated system the responds to commands from server 102 to modify resource parameters (e.g., temperature, pressure, flow, etc.). For example, resource control system 130 may be supervisory control and data acquisition (SCADA) system. In other scenarios, resource control system 130 is a programmable logic controller (PLC). A PLC may dictate that adjustments to a utilized resource, by polling management program 200, are converted to a communication (e.g., signal, interface) utilized by a PLC. For example, the PLC of resource control system 130 utilizes analog signals as opposed to digital signals. A digital-to-analog converter (DAC) may be needed to convert the information communicated from server 102 to a signal that interfaces with resource control system 130.

Figure 2:
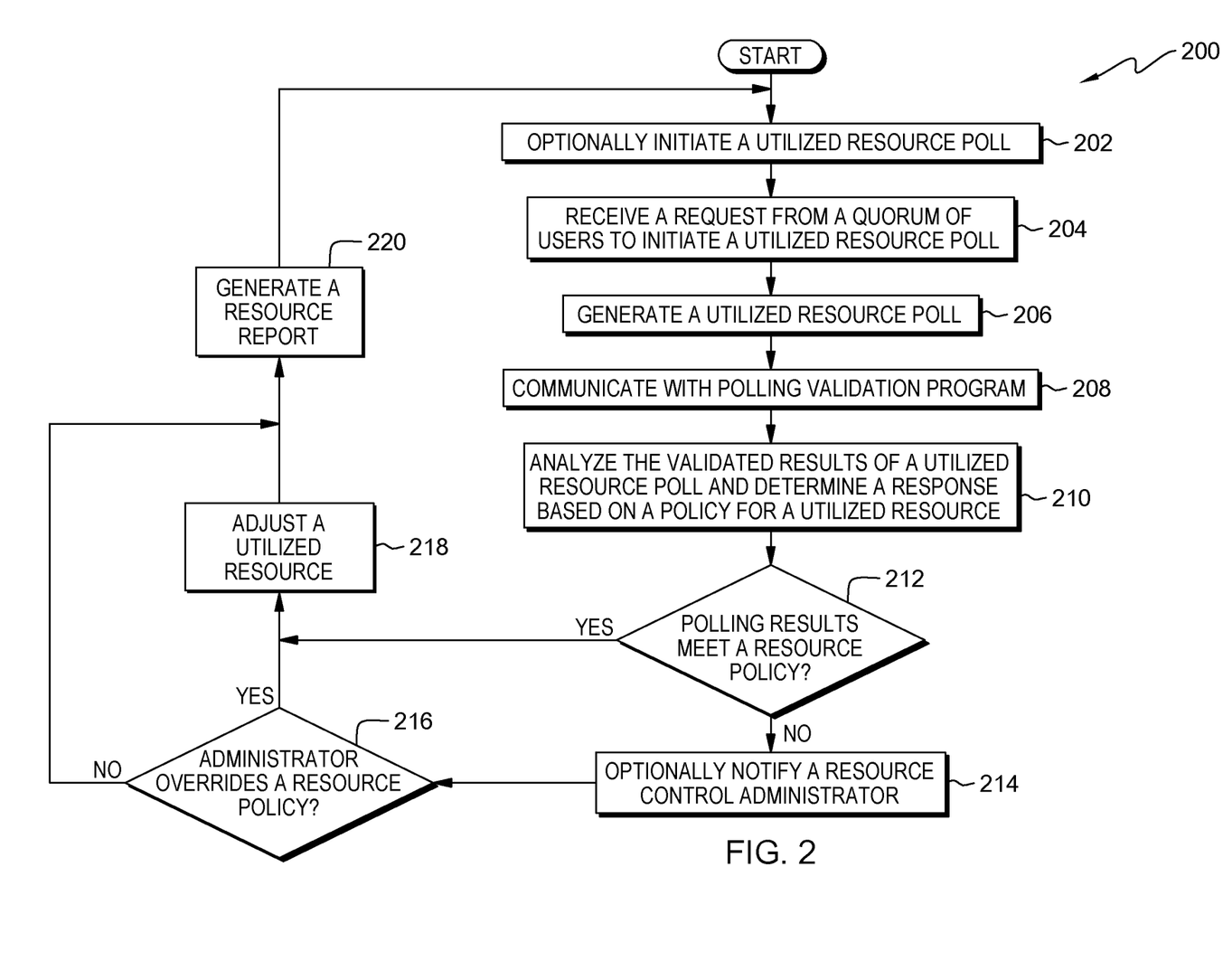
FIG. 2 depicts a flowchart of the operational steps of a polling management program, in accordance with an embodiment of the present invention.

FIG. 2 is a flowchart depicting operational steps for polling management program 200, a program for, generating polls in response to requests from users to adjust one or more parameters of a utilized resource. In addition, polling management program 200 determines whether an adjustment is make to the shared and an amount of the adjustment, in accordance with embodiments of the present invention.

In step 202, polling management program 200 optionally initiates a utilized resource poll. In an embodiment, polling management program 200 initiates a resource poll on a periodic basis. In one example, polling management program 200 initiates a resource poll at the beginning of each shift. In another example, polling management program 200 initiates a resource poll when the external environment of one or more buildings experiences a significant change (e.g., a change in weather). In another embodiment, polling management program 200 initiates a utilized resource poll based on the actions of a resource control administrator. In one example, polling management program 200 receives an indication from resource control system 130 that a manager submitted a priority maintenance request for a zone within a building. In another example, polling management program 200 receives an indication from a resource control manager that an area of a building (e.g., conference rooms) is populated with customers and that resource polls for these areas are governed by a subset of users.

In step 204, polling management program 200 receives a request for a quorum of users to initiate a utilized resource poll. In one embodiment, polling management program 200 initiates a utilized resource poll based on a quorum dictated by a resource policy. In another embodiment, polling management program 200 initiates a utilized resource poll based on a quorum dictated by a personnel (e.g., human resources) policy. In some embodiments, polling management program 200 utilizes one or more criteria (e.g., government regulations, safety regulations and policies, business policies, etc.) to determine the number of user that qualify as a quorum of users. In other embodiments, polling management program 200 determines the number of users that form a quorum based on one or more requirements of an area served by a utilized resource. In one scenario, polling management program 200 may determine that a quorum of users is two for a raised floor computing cluster area as opposed to fifteen for a manufacturing area. In another scenario, polling management program 200 may utilize one or more criteria to determine the number of user that qualify as a quorum of users. In an example, polling management program 200 utilizes the location of users to determine which users are counted toward the number of users for a quorum.

In step 206, polling management program 200 generates a utilized resource poll. Polling management program 200 may generate a poll that includes multiple resources or factors. For example, an HVAC resource may include the factors of temperature, humidity, and airflow. Based on the granularity of resource control system 130, polling management program 200 may create multiple polls to distribute (e.g., communicate) to different groups of users (e.g., employees of different floors). In some embodiments, polling management program 200 may include more than one utilized resource in a poll. In other embodiments, polling management program 200 may generate customized utilized resource polls. In some scenarios, polling management program 200 generates a customized utilized resource poll based on the affected area. In other scenarios, polling management program 200 generates a customized utilized resource poll based on the affected users.

In one embodiment, polling management program 200 generates a poll that includes qualitative factors (e.g., no change, slightly warmer, somewhat warmer, warmer, somewhat cooler, etc.). In another embodiment, polling management program 200 generates a utilized resource poll (e.g., choices) comprised of quantitative factors (e.g., +1 degree F., 45% RH, 30 cubic feet per minute (CFM), etc.). In one scenario, polling management program 200 generates a poll utilizing discreet increments (e.g., −5%, 0%, +5%, +10%) for a utilized resource. Polling management program 200 may utilize radio buttons, check boxes, or input areas for a user to vote (e.g. choose) for an adjustment to a utilized resource. In another scenario, polling management program 200 may utilize a continuous variable (e.g., a slide bar) for a user to vote for an adjustment to a utilized resource. Polling management program 200 may include a numeric value near the slide bar indicating the depicted adjustment amount for a utilized resource vote or the actual value for the utilized resource vote.

In step 208, polling management program 200 communicates with polling validation program 300. Polling management program 200 communicates one or more generated utilized resource polls to polling validation program 300. In some embodiments, polling management program 200 specifies which users and/or areas are associated with a utilized resource poll to polling validation program 300. In other embodiments, polling management program 200 may also dictate a duration for a poll (e.g., a valid response/voting time).

Subsequently, polling management program 200 receives the validated results of one or more utilized resource polls from polling validation program 300. In some embodiments, polling management program 200 receives the valid results for one or more utilized resource polls voted on (e.g., responded to) by users from polling validation program 300. In other embodiments, polling management program 200 receives the results of one or more utilized resource polls from polling validation program 300 from the users that responded to the one or more utilized resource polls.

In step 210, polling management program 200 analyses the validated results of a utilized resource poll and determines a response based on a policy for a utilized resource. Polling management program 200 utilizes various mathematical and statistical techniques to analyze the validated results of a utilized resource poll. For example, polling management program 200 may utilize: minimum value, maximum value, average value, weighted average, median value, cumulative average, quartile, discrete distribution (e.g., percentages of users), a simple majority of users, a fractional majority of users, etc. In some embodiments, polling management program 200 analyzes the responses (e.g., votes) identified by polling validation program 300 as valid responses. In other embodiments, polling management program 200 includes affected users that did not respond or generate valid responses in the analysis of a utilized resource poll. In an embodiment, polling management program 200 analyzes the validated results independent of a resource policy. After the analysis of the validated results, polling management program 200 utilizes criteria from a resource policy for a utilized resource and determines a response (e.g., action, no action, amount of adjustment to a utilized resource, etc.).

In another embodiment, polling management program 200 includes criteria from a resource policy in the analysis of the validated results of a utilized resource poll. In one example, polling management program 200 compares a distribution of votes for a utilized resource adjustment to one or more resource policy criteria. A first policy criterion may include the minimum number or percentage of users to affect a change. In one example, polling management program 200 determines that a first policy criterion dictates that 50% of valid responses vote for a humidity change. A second criterion may dictate the maximum adjustment (e.g., +/−3% RH) that may be made to the current state (e.g., RH %), and a third criterion may dictate a range for the RH % (e.g., 40% RH-55% RH) without an override from a resource control manager. Polling management program 200 utilizes the results of analysis to determine a response to the validated poll for a utilized resource. Polling management program 200 can store the results of utilized resource polls for future analysis. The future analysis of polling data can be utilized to update one or more utilized resource policies. In a further embodiment, polling management program 200 can combine one or more aforementioned techniques and resource policy criteria to analyze and process the validated results of a utilized resource poll.

In decision step 212, polling management program 200 determines whether the analyzed results of a poll meet a resource policy for a utilized resource. In one embodiment, polling management program 200 separately processes the results based on the resource policies of each utilized resource when two or more utilized resources are voted on within a poll. In another embodiment, polling management program 200 may determine that the results of a poll do not meet a resource policy if the results indicate that a warning trigger and/or an alternate response for a resource policy occur.

In decision step 212, responsive to determining that polling results do not meet a resource policy for a utilized resource (no branch, decision step 212), polling management program 200 optionally notifies a resource control administrator for a utilized resource (step 214). In some embodiments, if a resource control administrator is not subsequently notified, then polling management program 200 proceeds to decision step 216.

In step 214, polling management program 200 optionally notifies a resource control administrator. Polling management program 200 may notify a resource control administrator for a utilized resource when the results of a poll do not meet one or more thresholds and/or dictates of a resource policy. In one embodiment, polling management program 200 may notify a resource control administrator when an adjustment, based on poll results, exceeds the results of a warning threshold included in a resource policy. In an example, 95% of users vote for a three degree Fahrenheit (F) change in temperature for an area, signifying discomfort to a majority of users. In another embodiment, polling management program 200 notifies a resource control administrator when the polling results are related to a poll initiated by the resource control administrator.

In decision step 216, polling management program 200 determines whether a resource control administrator overrides a resource policy. In some embodiments, polling management program 200 does not receive an override indication and override adjustment (e.g., value) for a utilized resource from a resource control administrator. In other embodiments, polling management program 200 receives an override indication and override adjustment (e.g., value) for a utilized resource. In one scenario, polling management program 200 may receive an override indication and override adjustment for a utilized resource from a resource control administrator. In another scenario, polling management program 200 may receive an override indication and override adjustment for a utilized resource from an automated system (e.g., smart build control system). In an embodiment, if a resource control administrator is not notified (step 214), then polling management program 200 may utilize the no branch of decision step 216 and generates a resource report (step 220).

In decision step 216, responsive to determining that an administrator overrides a resource policy (yes branch, decision step 216), polling management program 200 adjusts a utilized resource (step 218).

Referring to decision step 212, responsive to determining that polling results meet a resource policy (yes branch, decision step 212), polling management program 200 adjusts a utilized resource (step 218).

In step 218, polling management program 200 adjusts a utilized resource. In one embodiment, polling management program 200 adjusts a utilized resource based on the response (e.g., adjustment) from the analysis of the validated results of a utilized resource poll that met a resource policy. In another embodiment, polling management program 200 adjusts a utilized resource based on an override of a resource control administrator. In one scenario, polling management program 200 adjusts a utilized resource based on the response (e.g., adjustment) from the analysis of the validated results of a utilized resource poll that did not meet a resource policy. In another scenario, polling management program 200 adjusts a utilized resource based on information (e.g., values) obtained from the resource control administrator.

Referring to decision step 216, responsive to determining that an administrator does not override a resource policy (no branch, decision step 216), polling management program 200 generates a resource report (step 220).

In step 220, polling management program 200 generates a resource report. The resource report may include multiple resources utilized within an area (e.g., complex, building, floor, etc.). A resource report may include varying degrees of granularity. For example, a resource report may incorporate sensor readings that appear when a user hovers a mouse pointer over a location on a floor plan. In one embodiment, polling management program 200 communicates a resource report to a plurality of users. In one scenario, polling management program 200 communicates a utilized resource report to the users that responded to a utilized resource poll. In another scenario, polling management program 200 communicates a utilized resource report to a user based on the location of user within an area (e.g., a building, a floor, a control zone, etc.). In another embodiment, polling management program 200 posts a resource report to a computing system (not shown) accessible by a plurality of users. In one example, polling management program 200 may utilize a website or a social media site. In another example, polling management program 200 generates a report as a time-varying spreadsheet. In some embodiments, polling management program 200 includes a method (e.g., button, comment box, hot-linked URL, etc.) to comment on a utilized resource to a resource control administrator.

In some embodiments, polling management program 200 loops to step 202 on a real-time basis. In other embodiments, polling management program 200 loops on a periodic basis. In one example, polling management program 200 loops based on a period defined by one or more resource policies (e.g., every 30 minutes during first shift, every other hour during third shift). In another example, polling management program 200 loops based on the movement of users (e.g., building occupancy changes). In an embodiment, polling management program 200 loops to step 202 in response to an indication from a resource control administrator. In an example, a resource control administrator utilizes polling management program 200 to initiate a new utilized resource poll to determine whether an override adjustment to a utilized resource is sufficient for the users.

Figure 3:
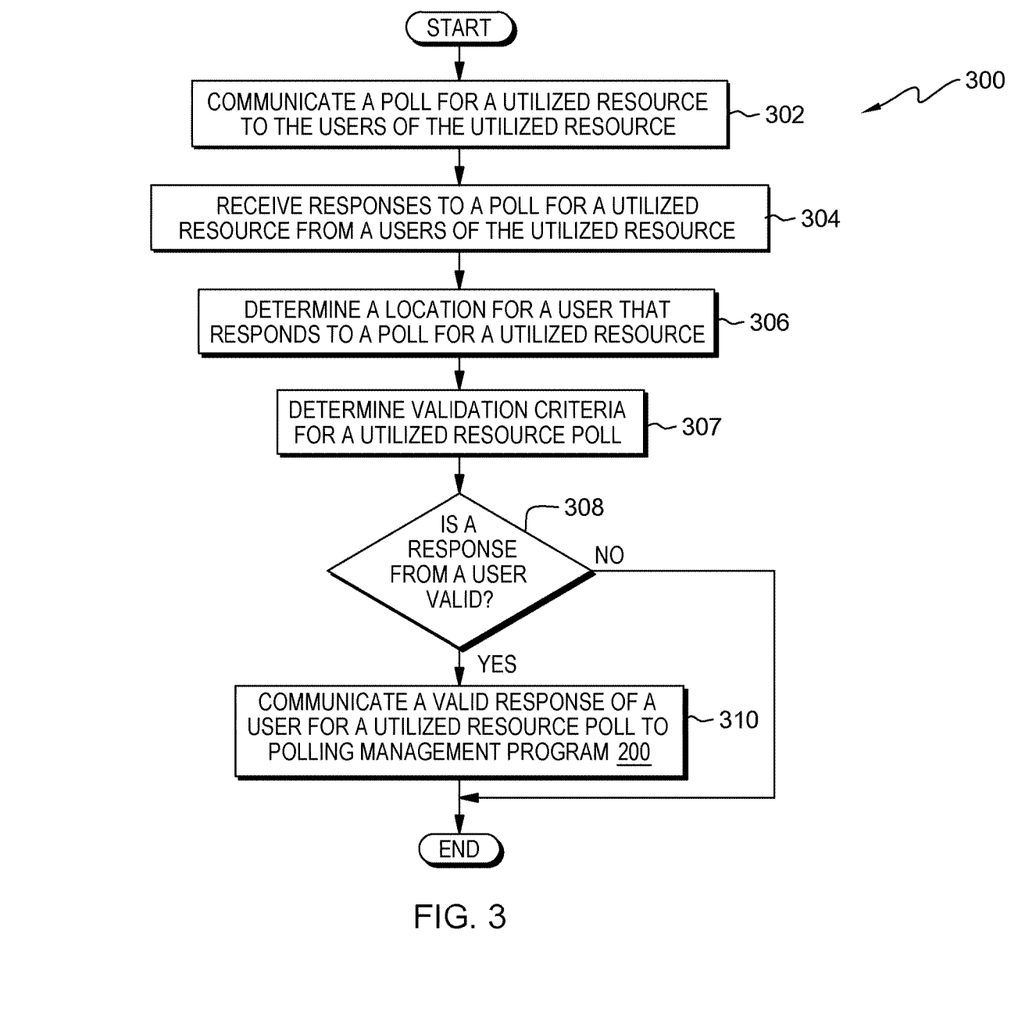
FIG. 3 depicts a flowchart of the operational steps of a polling validation program, in accordance with an embodiment of the present invention.

FIG. 3 is a flowchart depicting operational steps for polling validation program 300, a program for communicating one or more utilized resource polls generated by polling management program 200 to a plurality of users. Polling validation program 300 also validates the responses of the responding users and communicates the valid responses of users to polling management program 200, in accordance with embodiments of the present invention. In some embodiments, polling validation program 300 interfaces with users via a website (e.g., intranet, Internet).

In step 302, polling validation program 300 communicates a poll for a utilized resource to the users of the utilized resource. In some embodiments, polling validation program 300 communicates a poll that includes voting schemes for two or more utilized resources to the users of at least one utilized resource. For example, polling validation program 300 communicates a single poll that includes voting for multiple resources from polling management program 200 to all on-site users, as opposed to a poll that is customized for each user of a utilized resource. Subsequent validation (referring to decision step 308) by polling validation program 300 determines which votes associated with a given user are valid for a utilized resource. In other embodiments, polling validation program 300 communicates a poll generated by polling management program 200 in response to a request by a quorum of users (in step 204) to the users of the utilized resource. In one scenario, polling validation program 300 communicates with the users within a specific area (e.g., conference room, raised floor area, laboratory, etc.) that requested a utilized resource poll. In another scenario, polling validation program 300 communicates one or more polls generated by polling management program 200 to users associated with the quorum of users that requested the poll. In another embodiment, polling validation program 300 communicates a URL that is associated with a utilized resource poll to users of a utilized resource.

In step 304, polling validation program 300 receives responses to a poll for a utilized resource from users of the utilized resource. In some embodiments, polling validation program 300 receives the responses from individual users of a utilized resource via the communication method utilized by polling validation program 300 to communicate the poll. In other embodiments, polling validation program 300 receives a response for a poll via a different communication method (e.g., a web interface, a website). In one example, polling validation program 300 sends the user of user device 120C (e.g., a desktop computer) a poll via an e-mail. However, the user of user device 120C moves to a conference room and does not have access to user device 120C. The user utilizes a web browser on a computing device (e.g., a smartphone, a shared terminal, etc.) in the conference room to vote on the poll.

In step 306, polling validation program 300 determines a location for a user that responds to a poll for a utilized resource. In an embodiment, polling validation program 300 utilizes network 110 to determine the location of a user that responds to a poll for a utilized resource. In another embodiment, polling validation program 300 utilizes one or more databases on server 102 to cross reference LAN port IDs, SSIDs, and MAC addresses utilized as an access point by a user device to determine the location of a user within an area, building, or building complex that is associated with the utilized resource. In one embodiment, polling validation program 300 determines the location of a user by the LAN port utilized by user devices 120A-N.

In another embodiment, polling validation program 300 utilizes a non-wired technology for determining the location of a user that responds to a utilized resource poll. In one scenario, polling validation program 300 utilizes a wireless-based positioning system (WPS) to determine the location of a user. In an example, polling validation program 300 may utilize a combination of a measured intensity of the received signal (received signal strength (RSS)) and the method of "fingerprinting" (e.g., identifying) a wireless "hotspot" to determine the location of a user. A fingerprint for a wireless hotspot or wireless access point may include a SSID and a MAC address of the access point. In another scenario, polling validation program 300 determines the location of a user that utilizes a mobile computing device (e.g., a laptop computer, a tablet computer, a smartphone, etc.) by geo-locating the mobile computing device (e.g., user device 120M). In an example, polling validation program 300 may utilize the GPS coordinates of user device 120M to determine the location of the user of user device 120M when the user is not accessing a network connection "on-site." In some instances, polling validation program 300 tracks the location of the user of a user device (e.g., user device 120K) in real time by tracking the user device (e.g., user device 120K) utilized to respond to a poll.

In a further embodiment, polling validation program 300 utilizes different technologies to locate a user as opposed to a computing device (e.g., user device 120K) of a user. In one example, a business may include various security, limited access areas, and/or controlled access areas. Polling validation program 300 may communicate with a security/access control system (not shown) to track the location of a user. In some scenarios, polling validation program 300 obtains user location data based on access points (e.g., badge readers). In other scenarios, polling validation program 300 may obtain the location of a user in real time. In an example, the access badge of a user may include a security device, such as a radio-frequency identification (RFID) chip, which can communicate with a wireless network (e.g., network 110) within a building. In some instances, polling validation program 300 may utilize a combination of methods to determine the location of a user when multiple user devices are associated with a user. In an example, polling validation program 300 determines that a user utilizes a laptop computer, a tablet computer, and a smartphone. Polling validation program 300 may determine the location of the user by which user device is active and moving and/or engaging in network activity.

In step 307, polling validation program 300 determines validation criteria for a utilized resource poll. In one embodiment, polling validation program 300 may determine a duration associated with a utilized resource poll dictating when the responses of a user are valid. In one scenario, polling validation program 300 queries resource policy database 104 to determine a validation duration for a utilized resource poll. In one instance, polling validation program 300 determines that the validation duration is the same value for utilized resources that are voted on within a poll. In some instances, polling validation program 300 determines that resource policy database 104 dictates a method for determining the validation duration. In an example, resource policy database 104 may dictate: a fixed validation duration, a validation duration for the shortest duration among the utilized resources within a poll, a validation duration for the maximum duration among the utilized resources within a poll, or a validation duration that is the average of the durations of the utilized resources within a poll. In another scenario, polling validation program 300 determines that polling management program 200 dictates the validation duration of a utilized resource poll. In some scenarios, polling validation program 300 determines that a validation duration is dictated by a resource control administrator. In other scenarios, polling validation program 300 may receive an override command from a resource control administrator modifying (e.g., shortening, extending) the validation duration.

Referring to step 307, polling validation program 300 may also determine whether the responses of a user are valid based on the location of the user. In one embodiment, polling validation program 300 queries resource policy database 104 to determine whether the validation criteria for a utilized resource includes one or more dictates based on the location of a user. In one scenario, polling validation program 300 utilizes the location of a user at the point in time that the user responds (e.g., votes) on a utilized resource poll. In one example, a user of user device 120C responds to a utilized resource poll from the office of the user. Polling validation program 300 may determine from resource policy database 104 that a utilized resource (e.g., air conditioning) is location dependent (e.g., a floor of a building, a HVAC zone). If the user of user device 120C responds from user device 120C, then the response of the user is valid for the location containing user device 120C.

In another example, polling validation program 300 may determine that the user responded via user device 120I (e.g., a mobile phone), and user device 120I is outside of the building (e.g., the user is driving to work). Polling validation program 300 determines that the response originated at a location not included in a resource policy so the response of the user is invalid. In another scenario, polling validation program 300 tracks the location of a user to determine whether a response to a utilized resource poll is valid. In one instance, polling validation program 300 may initially validate the response of a user; however, if the user leaves the area (e.g., at any time, for a duration of time) associated with a utilized resource poll, the votes of the user for that poll are removed from subsequent analysis. In another instance, polling validation program 300 may transfer the votes (e.g., responses) to a utilized resource poll to another area when the user moves from one area to the other area. In some instances, polling validation program 300 may communicate, based on one or more resource policies, another utilized resource poll to a user when the user moves between areas.

In another embodiment, polling validation program 300 determines that resource policy database 104 includes tiered or combination criteria for determining whether the responses of a user are validated. In one example, polling validation program 300 may determine that resource policy database 104 dictates that certain users (e.g., contractors, manufacturing operators, etc.) are constrained as to which areas are affected by the responses of the certain users to utilized resource polls. In another example, polling validation program 300 may determine that a group of users working on a weekend may adjust (e.g., have validated votes) on a utilized resource (e.g., HVAC) for a zone (e.g., a conference room). If the group of users is distributed across multiple zones, polling validation program 300 may determine that the responses (e.g., votes) to a HVAC poll are invalid.

In decision step 308, polling validation program 300 determines whether the response from a user to a utilized resource poll is valid. In some embodiments, polling validation program 300 may determine whether one criteria invalidates multiple user responses. In one example, polling validation program 300 determines that a user did not respond to a utilized resource poll within a specified duration. In another example, polling validation program 300 may determine that a user is not at work (e.g., in a building) based on location information determined in step 306; therefore, the responses of the user are not valid. In other embodiments, polling validation program 300 may determine that some responses of a user to a utilized resource poll are valid. In an example, polling validation program 300 may receive a utilized resource poll from polling management program 200 that includes voting for three utilized resources (e.g., lighting, temperature and humidity (T&H)). Polling validation program 300 determines that the duration criteria for lighting is open ended and that T&H has a ten-minute voting duration; therefore, responses to a lighting vote are validated as the lighting responses occur. However, polling validation program 300 invalidates T&H responses received after the ten-minute polling duration.

In decision step 308, responsive to a determination that a response from a user is valid (yes branch, decision step 308), polling validation program 300 communicates the valid response to polling management program 200 (step 310).

In step 310, polling validation program 300 communicates a valid response of a user for a utilized resource poll to polling management program 200. In some embodiments, polling validation program 300 communicates the valid responses of a user to polling management program 200. On other embodiments, polling validation program 300 identifies the valid responses from the invalid responses of a user when multiple responses are included in a utilized resource poll associated with multiple utilized resources.

In an embodiment, responsive to determining that a response from a user is not valid (no branch, decision step 308), polling validation program 300 terminates. In another embodiment, responsive to determining that a response from a user is not valid (no branch, decision step 308), polling validation program 300 communicates that the response was invalid to polling management program 200. In an example, polling management program 200 may utilize the total number of users that respond to a poll to make a determination for a utilized resource as opposed to the total number of users that were sent the poll.

Figure 4:
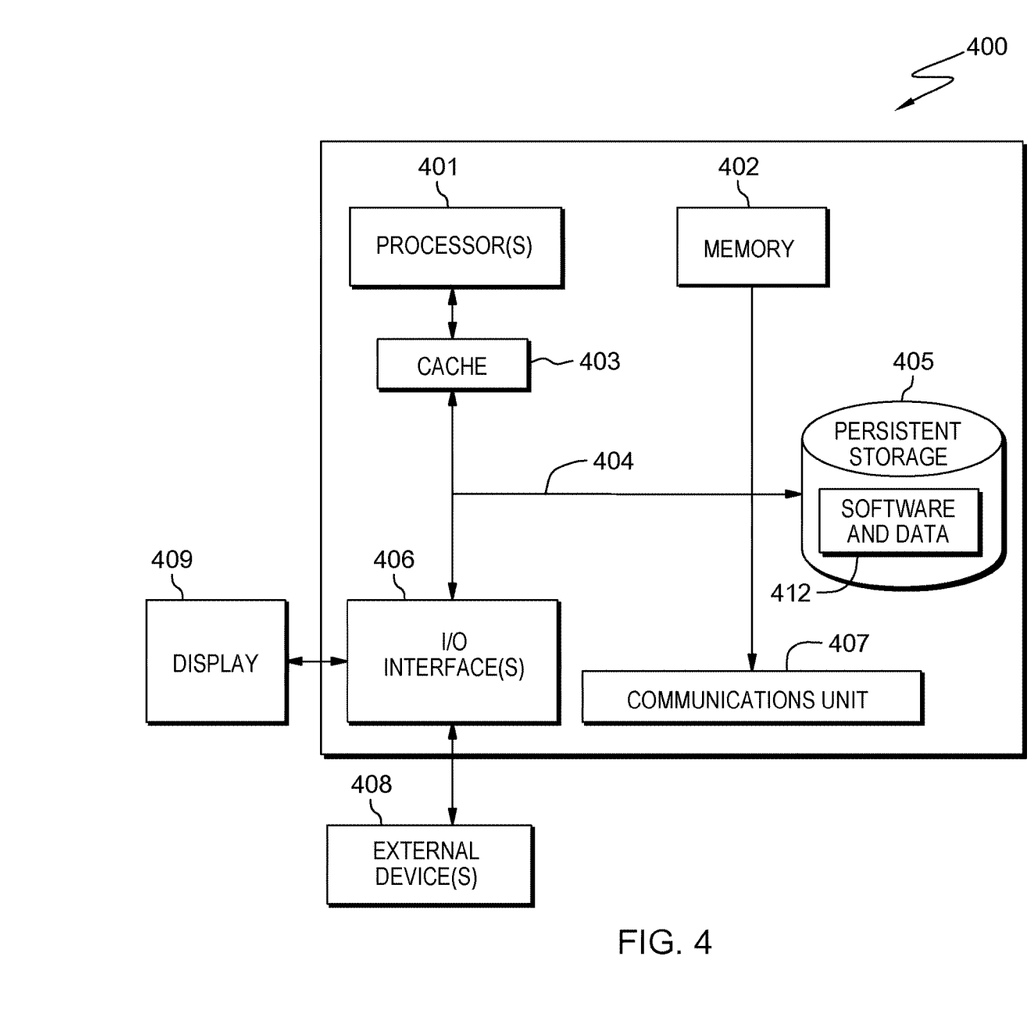
FIG. 4 is a block diagram of components of a computer, in accordance with an embodiment of the present invention.

FIG. 4 depicts computer system 400, which is representative of server 102, user devices 120A-N, and resource control system 130. Computer system 400 is an example of a system that includes software and data 412. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to server 102, software and data 412 includes resource policy database 104, polling management program 200, polling validation program 300, and various programs (not shown). With respect to user devices 120A-N, software and data 412 includes respective instances of user interface (UI) 122 and various programs (not shown). With respect to resource control system 130, software and data 412 includes various programs (not shown).

Communications unit 407, in these examples, provides for communications with other data processing systems or devices, including resources of server 102, user devices 120A-N, and resource control system 130. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Software and data 412 used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor. Display 409 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for adjusting a resource within an area utilizing voting by users, the method comprising:
   determining, by one or more computer processors, that a value corresponding to one or more of users requesting to adjust a resource associated with an area meets a threshold value to qualify as a quorum of users, wherein the quorum of users are located within an area affected by the request to adjust the resource, and wherein the quorum of users are determined based on a location associated with the one or more users requesting to adjust the resource;
   in response to determining that the quorum of users, located within the area affected by the request to adjust the resource, requests to adjust the resource associated with the area, generating, by one or more computer processors, a voting poll for the resource associated with the area;
   communicating, by one or more computer processors, the generated voting poll to a plurality of users within the area affected by the request to adjust the resource; and
   applying, by one or more computer processors, a response to the resource associated with the area, based on a first policy related to the resource and responses to the voting poll.

2. The method of claim 1:
   wherein the one or more users is sufficient to qualify as the quorum of users; and
   wherein the quorum of users is based on one or more elements selected from the group consisting of a policy associated with an area, a resource policy, a government regulation, a safety regulation, and a business policy.

3. The method of claim 1, wherein the resource includes defined parameters of at least one of: temperature, humidity, airflow, lighting, water temperature, and water pressure.

4. The method of claim 1, wherein applying the determined response to the resource associated with the area, based on a policy related to the resource and responses to the voting poll further comprises:
identifying, by one or more computer processors, valid responses to the communicated voting poll based on the policy related to the resource associated with the area; and
determining, by one or more processors, the response to the voting poll, wherein the response is based at least in part on the policy related to the resource and aggregated valid responses of the voting poll.

5. The method of claim 4, wherein identifying valid responses to the communicated voting poll further comprises:
determining, by one or more computer processors, whether a user included in the plurality of users provided a response to the communicated voting poll within a defined time duration based, at least in part, on another policy related to the resource; and
responsive to determining that the user did provide a response to the communicated voting poll within the defined time duration, identifying, by one or more computer processors, that the response provided by the user is a valid response.

6. The method of claim 5, further comprising:
determining, by one or more computer processors, whether the user of the valid response remains in the area affected by the request to adjust the resource for a threshold period of time during the voting poll; and
responsive to determining that the user leaves the area affected by the request to adjust the resource prior to the threshold period of time during the voting poll, removing, by one or more computer processors, the valid response provided by the user from aggregated valid responses of the voting poll.

7. The method of claim 1, wherein determining the response to the voting poll further comprises:
determining, by one or more computer processors, an adjustment to the resource based on a determination selected from the group consisting of a weighted average of the aggregated valid responses, an average of the aggregated valid responses, a median value of the aggregated valid responses, a simple majority of the aggregated valid responses, and a fractional majority of the aggregated valid responses.

8. A computer program product for adjusting a resource within an area utilizing voting by users, the computer program product comprising:
one or more computer readable storage media and program instructions stored on the one or more computer readable storage media, the program instructions readable/executable by one or more computer processors:
program instructions to determine that a value corresponding to one or more of users requesting to adjust a resource associated with an area meets a threshold value to qualify as a quorum of users, wherein the quorum of users are located within an area affected by the request to adjust the resource, and wherein the quorum of users are determined based on a location associated with the one or more users requesting to adjust the resource;
in response to determining that the quorum of users, located within the area affected by the request to adjust the resource, requests to adjust the resource associated with the area, program instructions to generate a voting poll for the resource associated with the area;
program instructions to communicate the generated voting poll to a plurality of users within the area affected by the request to adjust the resource; and
program instructions to applying a response to the resource associated with the area, based on a first policy related to the resource and responses to the voting poll.

9. The computer program product of claim 8:
wherein the one or more users is sufficient to qualify as the quorum of users; and
wherein the quorum of users is based on one or more elements selected from the group consisting of a policy associated with an area, a resource policy, a government regulation, a safety regulation, and a business policy.

10. The computer program product of claim 8, wherein the resource includes defined parameters of at least one of: temperature, humidity, airflow, lighting, water temperature, and water pressure.

11. The computer program product of claim 8, wherein program instructions to apply the determined response to the resource associated with the area, based on a policy related to the resource and responses to the voting poll further comprise:
program instructions to identify valid responses to the communicated voting poll based on the policy related to the resource associated with the area; and
program instructions to determine the response to the voting poll, wherein the response is based at least in part on the policy related to the resource and aggregated valid responses of the voting poll.

12. The computer program product of claim 11, wherein program instructions to identify valid responses to the communicated voting poll further comprise:
program instructions to determine whether a user included in the plurality of users provided a response to the communicated voting poll within a defined time duration based, at least in part, on another policy related to the resource; and
responsive to determining that the user did provide a response to the communicated voting poll within the defined time duration, program instructions to identify that the response provided by the user is a valid response.

13. The computer program product of claim 12, further comprising:
program instructions to determine whether the user of the valid response remains in the area affected by the request to adjust the resource for a threshold period of time during the voting poll; and
responsive to determining that the user leaves the area affected by the request to adjust the resource prior to the threshold period of time during the voting poll, program instructions to remove the valid response provided by the user from aggregated valid responses of the voting poll.

14. The computer program product of claim 8, wherein program instructions to determine the response to the voting poll further comprise:
program instructions to determinate an adjustment to the resource based on a determination selected from the group consisting of a weighted average of the aggregated valid responses, an average of the aggregated valid responses, a median value of the aggregated valid responses, a simple majority of the aggregated valid responses, and a fractional majority of the aggregated valid responses.

15. A computer system for adjusting a resource within an area utilizing voting by users, the computer system comprising:
one or more computer processors;
one or more computer readable storage media;
program instructions stored on the computer readable storage media for execution by at least one of the one or more computer processors, the program instructions comprising:
program instructions to determine that a value corresponding to one or more of users requesting to adjust a resource associated with an area meets a threshold value to qualify as a quorum of users, wherein the quorum of users are located within an area affected by the request to adjust the resource, and wherein the quorum of users are determined based on a location associated with the one or more users requesting to adjust the resource;
in response to determining that the quorum of users, located within the area affected by the request to adjust the resource, requests to adjust the resource associated with the area, program instructions to generate a voting poll for the resource associated with the area;
program instructions to communicate the generated voting poll to a plurality of users within the area affected by the request to adjust the resource; and
program instructions to applying a response to the resource associated with the area, based on a first policy related to the resource and responses to the voting poll.

16. The computer system of claim 15:
wherein the one or more users is sufficient to qualify as the quorum of users; and
wherein the quorum of users is based on one or more elements selected from the group consisting of a policy associated with an area, a resource policy, a government regulation, a safety regulation, and a business policy.

17. The computer system of claim 15, wherein the resource includes defined parameters of at least one of: temperature, humidity, airflow, lighting, water temperature, and water pressure.

18. The computer system of claim 15, wherein program instructions to apply the determined response to the resource associated with the area, based on a policy related to the resource and responses to the voting poll further comprise:
program instructions to identify valid responses to the communicated voting poll based on the policy related to the resource associated with the area; and
program instructions to determine the response to the voting poll, wherein the response is based at least in part on the policy related to the resource and aggregated valid responses of the voting poll.

19. The computer system of claim 18, wherein program instructions to identify valid responses to the communicated voting poll further comprise:
program instructions to determine whether a user included in the plurality of users provided a response to the communicated voting poll within a defined time duration based, at least in part, on another policy related to the resource; and
responsive to determining that the user did provide a response to the communicated voting poll within the defined time duration, program instructions to identify that the response provided by the user is a valid response.

20. The computer system of claim 19, further comprising:
program instructions to determine whether the user of the valid response remains in the area affected by the request to adjust the resource for a threshold period of time during the voting poll; and
responsive to determining that the user leaves the area affected by the request to adjust the resource prior to the threshold period of time during the voting poll, program instructions to remove the valid response provided by the user from aggregated valid responses of the voting poll.

* * * * *